Jan. 9, 1934.  J. D. COCHIN  1,943,003
CHOCK FOR VEHICLE ELEVATORS
Filed Nov. 16, 1931
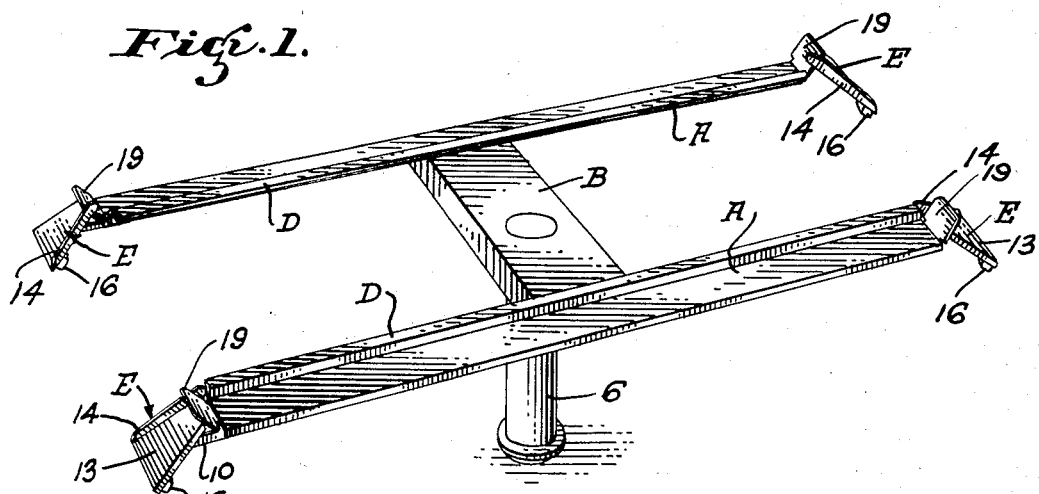
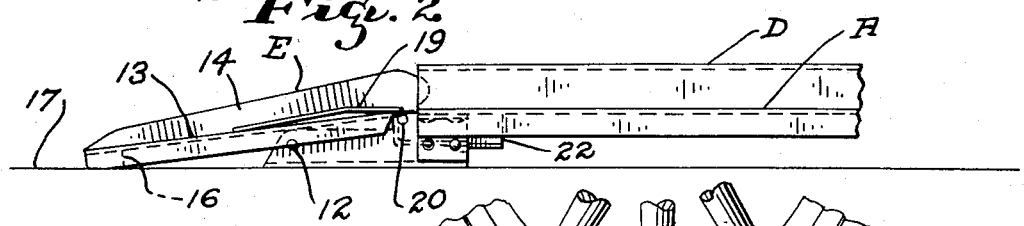
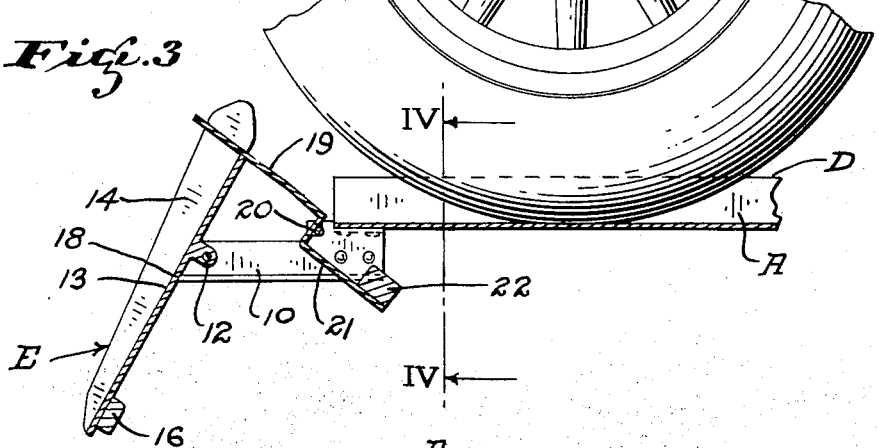
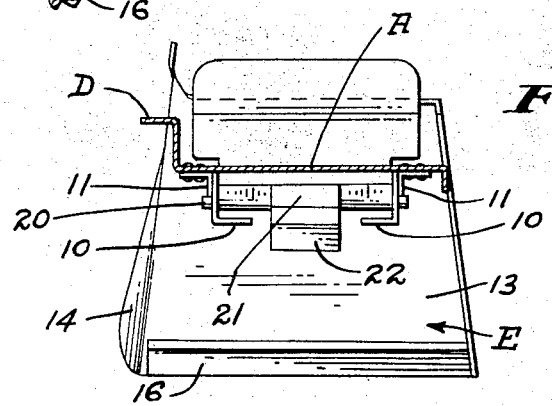
INVENTOR.
John D. Cochin.
BY Townsend and Loftus.
ATTORNEYS.

Patented Jan. 9, 1934

1,943,003

UNITED STATES PATENT OFFICE 1,943,003

CHOCK FOR VEHICLE ELEVATORS

John D. Cochin, San Francisco, Calif.

Application November 16, 1931
Serial No. 575,230

4 Claims. (Cl. 254—89)

This invention pertains to a chock for vehicle elevators, and more particularly to a device to be used in connection with a vehicle elevator of the type upon which a vehicle is supported by its wheels and raised from the ground. The device is provided primarily for the purpose of preventing the vehicle from rolling off of its support in the event that its brakes do not maintain it in a stationary position thereon.

The type of elevator for which the present invention is particularly designed consists generally of a pair of spaced elongated rails or tracks upon which the wheels of a vehicle may be supported and means for raising the rails above the floor to elevate the vehicle. It is customary practice in the use of such devices for the operator to apply the brakes of the vehicle and rely upon the brakes to prevent it from rolling off of the track. In instances where the brakes must be released in order to permit them to be adjusted or repaired, it has been the custom to place blocks or chocks against the wheels to prevent rolling. Both of these methods have proven unsatisfactory, first, because the operator frequently forgets to apply the brakes or place chocks under the wheels, and, secondly, because the brakes may fail to hold or may become jarred loose from the movement of the elevator or work being performed upon other parts of the vehicle.

It is therefore the object of the present invention to provide wheel chocks for vehicle elevators that will become effective automatically upon upward movement of the elevator, that will become ineffective upon downward movement of the elevator when it approaches the ground or floor and that will serve, in their ineffective position, as inclined approaches to the wheel supporting rails or trackways.

One form of invention is shown by way of illustration in the accompanying drawing and described in the following specification. Further objects and advantages will become apparent through an understanding of the specification and drawing.

In the drawing—

Fig. 1 is a perspective view of a vehicle elevator equipped with chocks embodying my invention.

Fig. 2 is a side elevation of one end of one of the vehicle supporting rails of the elevator shown in Fig. 1 and showing the chock in its effective position.

Fig. 3 is a view similar to Fig. 2, showing the wheel of a vehicle supported upon the rail and the chock in its effective position.

Fig. 4 is a section taken on the line IV, IV of Fig. 3.

Referring more particularly to the drawing and, first, to Fig. 1, a vehicle elevator is illustrated as consisting of a pair of vehicle supporting rails or trackways A. The rails A are supported and connected by means of a cross member B which is mounted upon a piston C. The piston C is vertically disposed and forms a part of a fluid actuated ram (not shown) by means of which it may be reciprocated in a vertical direction to raise and lower the rails A. In operation, the piston C is lowered until the rails A rest upon, or slightly above, the floor under which the ram is disposed. With the elevator in this position, a vehicle is driven onto the rails A, so that its wheels are directly supported thereby, and it is then raised above the floor to a position at which it is conveniently accessible to mechanics. The inner edges of the rails A are provided with upwardly turned flanges D to guide the wheels of the vehicle as they travel over the rails. Each end of each of the rails A is provided with a wheel chock generally indicated at E, the construction of which is best shown in Figs. 2, 3 and 4. In these figures the rails A are shown as provided on the under side of their outer ends with a pair of outwardly extending angular brackets 10. The brackets 10 are shown as connected to the rail by angle members 11, to which they are riveted or welded or secured in any other suitable manner. The angle members 11 are in turn suitably secured to the lower surface of the rails A. If desired, the brackets 10 may be connected directly to the rails A.

Pivotally mounted between the brackets 10 and adjacent the outer edges thereof, as by a pin 12, is a plate 13. The plate 13 is of substantially the same width, or a little wider, than the top surface of the rails A and is provided at one edge with an upwardly turned flange 14 which serves as a guide for a wheel rolling over the plate, and at its other edge with a downwardly turned flange 15, which, with the flange 14, lends rigidity to the plate. The outer end of the plate 13 is provided with a wear strip 16 of considerable weight. This wear strip engages the floor with a sliding movement, and therefore suitable anti-friction means may be used in its place if desired. This, however, under ordinary circumstances is unnecessary. When the elevator is in its lowered position, the wear strip 16 engages the floor 17, as illustrated in Fig. 2, and the plate 13 assumes the position of an inclined runway leading from the floor to the rail A. When the elevator is raised from the floor, the plate 13 pivots about its support 12 as the result of the weight 16 at its outer end, and also due to the fact that its pivotal mounting is positioned nearer to its inner end than to its outer end.

The brackets 10 are provided with beveled outer edges, as shown at 18, which serve as stops to limit the pivotal movement of the plate 13 when it attains the position shown in Fig. 3.

A chock plate 19, the construction of which is best shown in Fig. 3, pivotally mounted between the brackets 10, as at 20, and normally overlies the inner edge of the plate 13, forming a substantially smooth surface over which the wheels of a vehicle may roll without obstruction. However, when the elevator is raised and the plate 13 swings by gravity to the position shown in Fig. 3, the inner end of the plate 13 bears upwardly against the lower surface of the chock plate 19 and raises the same to an inclined position. The chock 19 is supported in this position by the plate 13, which is disposed substantially perpendicular to it, and the chock plate thus serves as an obstruction or barrier which positively prevents the wheel of a vehicle from rolling off of the end of the rail.

The inner end of the chock plate 19 may be provided with an extension 21, carrying a weight 22. The extension and weight serve to lessen the effective weight of the plate 19, and thereby assist in raising it to its effective position. It should be understood, however, that the weight of the plate 19 should slightly exceed that of the extension 21 and weight 22, so that the plate 19 will normally gravitate to the position shown in Fig. 2.

The operation of the device as shown and described is as follows:

When the elevator is in its lowered position, with the trackways A adjacent the floor, as shown in Fig. 2, a vehicle is driven onto it, using the plates 13 and 19 as an inclined runway or approach. The elevator is then raised and as the outer ends of the plates 13 leave the floor they move downwardly to assume the position shown in Fig. 3, and during this downward movement the inner ends of the plate 13 engage the lower surface of the plates 19 and raise them to a position at which they are effective in preventing the vehicle from rolling off of the rails. Thus, immediately upon raising of the elevator, the chocks are automatically positioned to establish absolute safety. When the elevator is lowered, the outer ends of the plates 13, or their weights 16, as the case may be, engage the floor just before the elevator attains its lowermost position. This engagement causes the plates 13 to swing upwardly and release the chock plates 19, permitting them to swing downwardly, and as soon as the elevator is completely lowered, the vehicle may be driven off over the plates.

Although I have shown my invention as applied to a vehicle elevator of a certain type, it will be readily seen that the same may be applied to many different types of elevating devices, and is not limited in its use to any particular type of structure; and while I have shown a preferred form of the same, it should be understood that various changes may be resorted to in the arrangement and construction of its several parts within the spirit and scope of the appended claims.

Having thus described my invention, what I claim and desire to secure by Letters Patent, is:—

1. In combination with a trackway and means for raising and lowering it with relation to the floor, a chock plate connected for pivotal movement adjacent an end of the trackway and balanced to normally lie in substantially the same plane as the trackway, a second plate pivotally mounted intermediate its ends adjacent said end of the trackway and having its inner end disposed beneath the chock plate and its outer end resting on the floor, said outer end being heavier than said inner end, whereby it will pivot downwardly upon raising of the trackway and whereby said inner end will pivot upwardly and raise said chock plate.

2. In combination with a trackway, and means for raising and lowering it with relation to the floor, a chock plate connected for pivotal movement adjacent an end of the trackway and balanced to normally lie in substantially the same plane as the trackway, a second plate pivotally mounted intermediate its end adjacent said end of the trackway and having its inner end disposed beneath the chock plate and its outer end resting on the floor, said outer end being heavier than said inner end, whereby it will pivot downwardly upon raising of the trackway and whereby said inner end will pivot upwardly and raise said chock plate and stop means limiting the pivotal movement of said second plate.

3. In combination with a trackway and means for raising and lowering it with relation to the floor, a chock plate connected for pivotal movement adjacent an end of the trackway and balanced to normally lie in substantially the same plane as the trackway, a second plate pivotally mounted intermediate its ends adjacent said end of the trackway and having its inner end disposed beneath the chock plate and its outer end resting on the floor, said outer end being heavier than said inner end, whereby it will pivot downwardly upon raising of the trackway and whereby said inner end will pivot upwardly and raise said chock plate and stop means limiting the pivotal movement of said second plate when it assumes a position substantially perpendicular to the chock plate.

4. In combination with a trackway of the character described, a chock pivoted for movement to and from a chocking position, a runway pivoted for movement to and from a runway position, a portion of said runway underlying a portion of said chock whereby movement of the runway from a runway position will cause it to engage and move said chock to a chocking position.

JOHN D. COCHIN.